Sept. 10, 1957 H. BENDER 2,805,944

LEAD ALLOY FOR BONDING METALS TO CERAMICS

Filed Sept. 16, 1953

INVENTOR
HARRY BENDER
BY
F. Kumpf
ATTORNEY

# United States Patent Office 2,805,944

Patented Sept. 10, 1957

2,805,944

LEAD ALLOY FOR BONDING METALS TO CERAMICS

Harry Bender, Albertson, N. Y., assignor to Sylvania Electric Products Inc., a corporation of Massachusetts Application September 16, 1953, Serial No. 380,533

8 Claims. (Cl. 75—166)

This invention relates to an alloy suitable for making metal-to-ceramic seals. More particularly, it relates to a lead base alloy for bonding ceramic bodies together or of bonding glass or ceramic bodies to metal.

Many processes and materials have been developed for making this type of seal. The joining of glass and ceramic bodies to metals or ceramic bodies to each other in a gas tight manner has become more and more important and in some cases necessary for the functioning of certain electronic equipment. The simplest technique which has been developed by the prior art is the so-called silver paste technique. This technique though satisfactory for some uses does not make for a completely satisfactory gas tight bond. When the bond formed in this manner is subjected to certain types of abrasive action the metal put on in this manner has a tendency to peel off and thus destroy the gas tight seal. Many other methods have also been devised amongst them and probably one which has been considered to give the best results is the so-called Telefunken process in which molybdenum is used in promoting the metal-to-ceramic bond. When this method is used with the proper ceramics and under the right temperature conditions excellent vacuum type seals can be obtained between metal bodies and ceramics. However, the disadvantage with the process is that it must be carried out in several steps and secondly in that it is limited in its application to the bonding of materials whose coefficients of expansion are matched.

It is the object to provide an alloy for doing this which can be used successfully in the bonding together of materials whose coefficients of expansion may be mismatched.

In accordance with this invention it has been found that these and other objects and advantages can be obtained with the use of a lead base alloy containing at least 0.5% of copper and at least 0.1% of titanium or zirconium.

Figure 1:
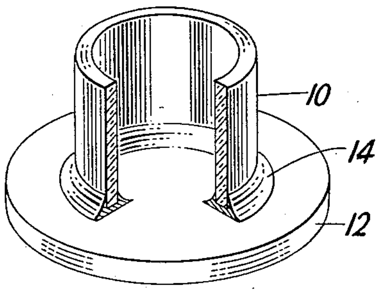

In the accompanying drawings which illustrate features of this invention Figure 1 is a perspective view showing two ceramic bodies bonded together with the aid of a metal bond.

Figure 2:
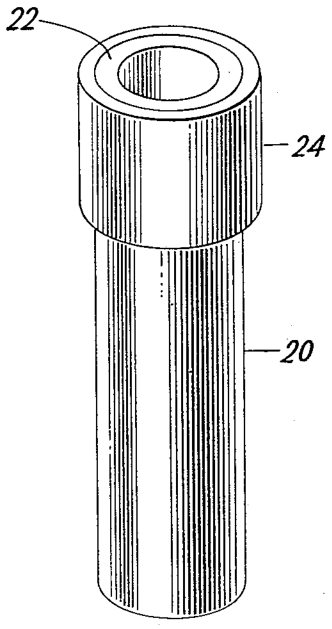

Figure 2 of the drawings is a perspective view of a metal tube which has been metallized on one end thereof the metal extending a considerable distance up along the outside side wall.

Figure 3:
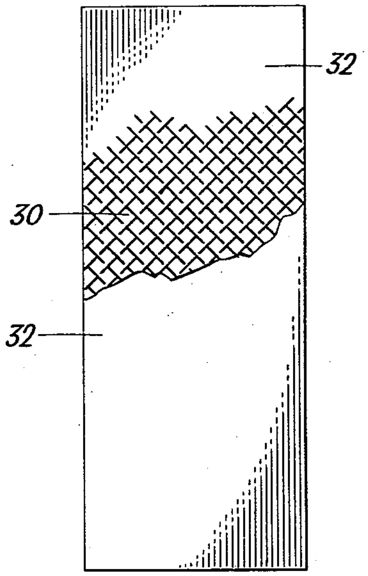

Figure 3 is a plan view partially in section showing the alloy of this invention embedded within the pores of a screen-like material.

The alloy which has been found to be suitable for making the metal-to-ceramic seals in accordance with this invention is one which has preferably at least three component elements. The base metal is lead. Titanium or zirconium form the second component and it is present in an amount not less than 0.1%, and copper the third component is present in an amount not less than 0.5%. With this alloy it is possible to make a good ceramic-to-metal or ceramic-to-ceramic seal bonded with a metallic bond. This can be done in a single step operation and is not limited to a bonding together of bodies having similar coefficients of expansion. The method and bonding alloy can be used universally for the bonding together of any of the ceramic bodies with each other or with metal. The bond can also be used in the bonding of glass to metal or ceramic.

The alloy which is formed from the mixture of the three components is fairly ductile in nature and can be formed into bars, sheets, wire and numerous other shapes which might be deemed to be useful and adaptable in the making of the seal. A bond or seal can be made in a very simple manner, by taking the parts which are to be bonded together, subjecting them to a simple cleaning operation to remove any foreign materials which may be on the surface, placing them together, for example, to form a butt joint with a piece of the alloy material positioned therebetween, for example, in the form of a washer, and then heating them in a non-oxiding atmosphere.

To obtain best results the parts should be heated to a temperature of 700–800° C. for a period of about three minutes. When the parts have been cooled it will be found that they have been joined in a vacuum tight manner and that the metal is tightly bonded to the ceramic and cannot be peeled or cut away from the ceramic body.

This process is very simple in nature. It requires no formidable technically detailed steps for the preparation of the material and yet results in the formation of a very good vacuum-tight bond between the materials that have been joined. Furthermore, the process can be carried out in a very simple non-oxidizing furnace in which the atmosphere is either hydrogen, vacuum or some other inert gas.

Figure 1 of the drawings shows two of ceramic parts which have been bonded together in this manner. 10 is a tubular piece of ceramic which has been bonded to a disc-like wafer 12 by means of the alloy 14.

In Figure 2 is shown a tubular member 20 which has been metallized at one end 22 with the use of the alloy to form the metallized surface at 24. The wettability of this alloy is so good, in certain instances, when the preferred composition is made use of that there is a tendency for the alloy to run at the bond and in order to hold the alloy in place so that the metal will actually cover the areas which it is intended to metallize it has been found that a special structure may be desirable. A structure of this type is shown in Figure 3 wherein the alloy is embedded within the pores of a screen-like material 30. There one can see the metallic parts 32 surrounding the screen-like material embedded within the interstices of the screen-like member. The member 30 is, of course, made of a metal or other material which can withstand the high temperatures and can then be removed mechanically.

Although the compositions of the alloy which is used for this purpose can be varied considerably it has been found that excellent results can be obtained with alloys in which the copper content may be as high as 7%. The compositions which have given best results to date and are therefore the preferred compositions are those which contain about 3 to 7% copper and 0.1 to 3% titanium in lead. If the alloy is to have any wetting properties it should contain at least 0.5% copper. These materials can readily be made by mixing the components and melting them in a vacuum furnace at a temperature of about 1200° C. After they have been held in the vacuum furnace for a sufficient length of time to form a homogeneous mixture they are rapidly poured into a water cooled mold. This is done in order to solidify them as rapidly as possible and thus prevent the separation of the copper and titanium which might otherwise tend to form a more unhomogenous slug of the solidified metal.

This alloy has been found to be particularly suitable for the bonding together of materials whose coefficient of expansion may be mismatched.

While the above description and drawings submitted herewith disclose a preferred and practical embodiment of the alloy and the method of making a metal-to-ceramic seal of this invention it will be understood that the specific details shown and described are by way of illustration and are not to be construed as limiting the scope of the invention.

What is claimed is:

1. An alloy suitable for the bonding of metals to ceramics consisting essentially of lead containing approximately 3% titanium and 3% copper.

2. An alloy suitable for the bonding of metals to ceramics consisting essentially of lead, titanium and copper in which the percentage of copper lies within the range of 0.5–7%, the percentage of titanium lies within the range of .1–3% and the balance is lead.

3. An alloy suitable for the bonding of metals to ceramics consisting essentially of lead, titanium and copper in which the percentage of copper lies within the range of 0.5–7%, the percentage of titanium is approximately 3% and the balance is lead.

4. An alloy suitable for the bonding of metals to ceramics consisting essentially of lead, titanium and copper in which the percentage of copper is approximately 3%, the percentage of titanium lies within the range of .1 to 3% and the balance is lead.

5. An alloy suitable for the bonding of metals to ceramics consisting essentially of lead, copper, and a further metal selected from the group consisting of titanium and zirconium, the percentage of copper being within the range of .5 to 7%, the percentage of said further metal being within the range of .1 to 3% and the balance being lead.

6. An alloy suitable for the bonding of metals to ceramics consisting essentially of lead, copper, and a further metal selected from the group consisting of titanium and zirconium, the percentage of copper being within the range of .5 to 7%, the percentage of said further metal being approximately 3% and the balance being lead.

7. An alloy suitable for the bonding of metals to ceramics consisting essentially of lead, copper, and a further metal selected from the group consisting of titanium and zirconium, the percentage of copper being approximately 3%, the percentage of said further metal being within the range of .1 to 3%, and the balance being lead.

8. An alloy suitable for the bonding of metals to ceramics consisting essentially of lead, copper, and titanium, the percentage of copper being within the range of 3 to 7%, the percentage of titanium being within the range of .1 to 3% and the balance being lead.

References Cited in the file of this patent

UNITED STATES PATENTS

| | | |
|---|---|---|
| 1,020,514 | Rossi | Mar. 19, 1912 |
| 1,020,516 | Rossi | Mar. 19, 1912 |
| 1,335,982 | Petinot | Apr. 6, 1920 |
| 1,500,954 | Mathesius | July 8, 1924 |
| 1,547,394 | Hoyt | July 28, 1925 |
| 1,699,761 | Silberstein | July 22, 1929 |
| 2,163,408 | Pulfrich | June 20, 1939 |
| 2,230,205 | Rowland | Jan. 28, 1941 |
| 2,282,106 | Underwood | May 5, 1942 |
| 2,333,622 | McNab | Nov. 2, 1943 |
| 2,366,954 | Brooks | Jan. 9, 1945 |
| 2,402,661 | Ohl | June 25, 1946 |
| 2,454,270 | Braunsdorff | Nov. 23, 1948 |
| 2,461,878 | Christensen | Feb. 15, 1949 |
| 2,482,178 | Harris | Sept. 20, 1949 |
| 2,490,571 | Ainceft | Dec. 6, 1949 |
| 2,602,775 | Isherwood | July 8, 1952 |
| 2,607,981 | Nelson | Aug. 26, 1952 |
| 2,647,218 | Sorg | July 28, 1953 |